May 31, 1938.  D. A. ALLEE  2,119,376
SUPPORTING STRUCTURE
Filed Jan. 27, 1934
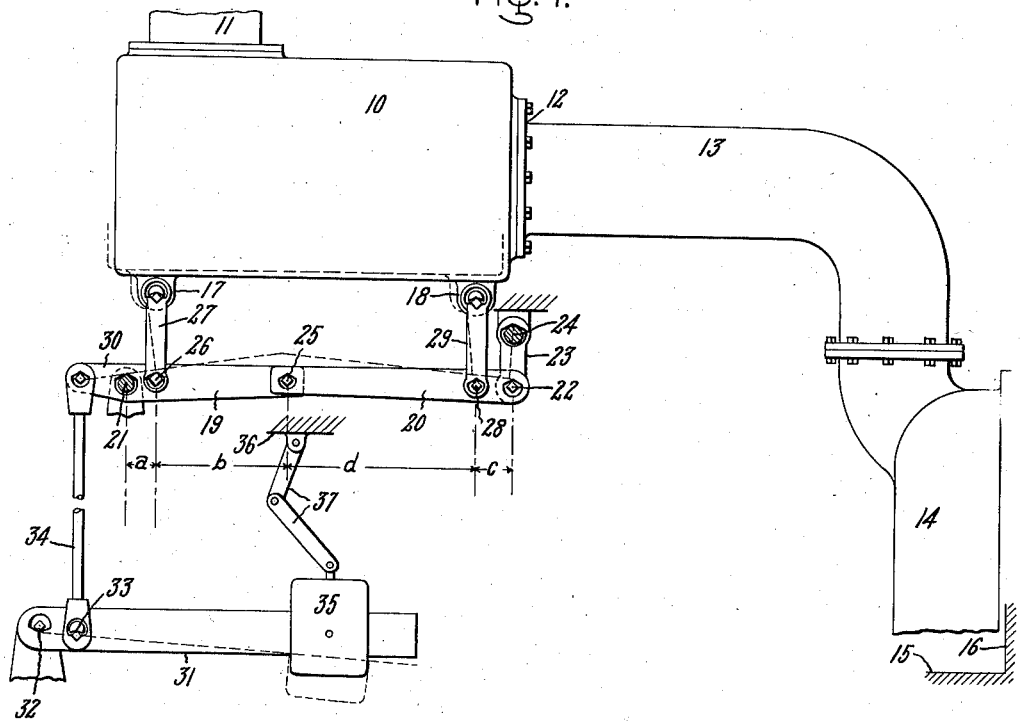
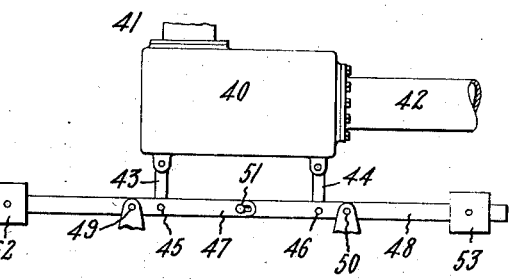
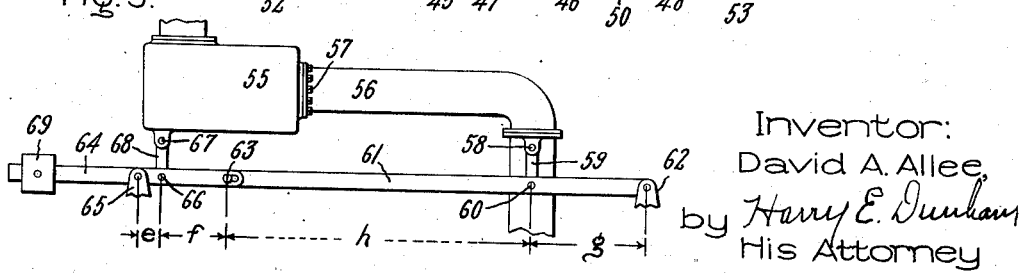
Inventor:
David A. Allee,
by Harry E. Dunham
His Attorney Patented May 31, 1938

2,119,376

UNITED STATES PATENT OFFICE 2,119,376

SUPPORTING STRUCTURE

David A. Allee, Scotia, N. Y., assignor to General Electric Company, a corporation of New York Application January 27, 1934, Serial No. 708,563

5 Claims. (Cl. 253—39)

The present invention relates to supporting structures for heavy bodies, which bodies are required to move, by small amounts and simultaneously, with other bodies to which they are attached. More specifically, the invention relates to supporting structures for heavy control valve casings or the like which are connected to prime movers, without adequate flexibility in the interconnection to provide for expansion and contraction. These valves may weigh many tons in the case of modern elastic fluid turbines. If the turbine and the interconnecting pipe expand, thereby changing the relative positions of the turbine and the valve, stresses and deformations are set up in the turbine and the valve which may break said turbine or valve or so distort them as to make their operation unsafe or unsatisfactory. If the valve casing is supported at two points, it may happen that movement or deformation of the valve casing, due to expansion of the turbine, lifts the casing from one of its supporting points and thereby throws more weight of the valve casing on the other supporting point. Furthermore, angular movement of the valve casing may interfere with the operation of its movable parts and other elements cooperating therewith.

The object of my invention is to provide an improved construction and arrangement for supporting heavy bodies of the kind above specified and the like, whereby movement of such bodies due to external or internal forces is constrained to certain predetermined directions and conditions. In the case of a supporting structure for a valve, the arrangement is such that the valve is constrained to parallelism or relative horizontality. By this I mean that the support permits only parallel movement of the valve. All points located in a horizontal plane remain in such horizontal plane, or from another viewpoint the support forces the valve to move in parallelism. This is accomplished by supporting the body or valve at at least two points horizontally spaced apart by means of a lever mechanism which is connected to the supported points of the valve or body and permit only equal and uniform movement of said points or from a broader viewpoint, restrains movement of said points to a predetermined condition.

For a better understanding of what I consider to be novel and my invention, attention is directed to the following description and the claims appended thereto.

In the drawing I have shown by way of example in Fig. 1 a supporting structure for a turbine valve embodying my invention, and in Figs. 2 and 3 modified supports for a similar structure.

The valve structure in Fig. 1 is in the form of a large chest 10, weighing several tons, having an inlet 11 for receiving elastic fluid and an outlet 12 for discharging elastic fluid to a conduit 13 connected to the inlet of an elastic fluid turbine 14. During operation, the turbine and also the conduit expand in horizontal and vertical directions. In the present example the arrangement is such that the turbine is rigidly supported on a floor 15 and against a wall 16 at its exhaust end. The turbine then can only expand in vertical, upward direction and in horizontal direction towards the left, that is, towards its inlet end. The same is true with respect to the conduit 13 being rigidly connected to the turbine inlet. Thus, the entire expansion of the turbine and the conduit is transmitted to the valve structure 10. The valve structure 10 has two supporting points indicated in the form of ears 17 and 18 respectively. Assuming these two points were supported on a fixed base, then the supporting point 18 would be lifted upward, away from the base, during expansion of the turbine 14 and the conduit 13, to the effect that the entire weight of the structure aside from that carried on turbine 14 to support 15 would be transmitted to the fixed support through the supporting point 17. In many cases this would cause excessive strains on the support beneath point 17 and in addition the valve would assume an angular or tilted position and thereby affect the free movement of elements contained in the valve chest (not shown) and other elements cooperating therewith. In addition the high stresses set up between the conduit, the valve and the turbine might cause considerable deformation of these parts, resulting in breaking of the bolted connections between the conduit, the valve chest and the turbine.

According to my invention, as stated above, the supporting points 17 and 18 of the valve chest are connected to a lever mechanism which permits free movement of said points 17 and 18 but constrains the points to uniform and equal movements, that is, the points 17 and 18 may move an equal distance in horizontal, or vertical, or any other angular direction at one time.

The lever mechanism in the present instance comprises two levers 19 and 20 fulcrumed at 21 and 22 respectively. The fulcrum 21 for the lever 19 is rigid, whereas the fulcrum 22 for the lever 20 is formed by a link 23 having one end connected to the right-hand end of the lever 20 and another end connected to a fixed point 24.

The left-hand end of the lever 20 is connected to the right-hand end of the lever 19 by a pivot 25. An intermediate point 26 of the lever 19 between its fulcrum 21 and its pivot 25 is connected to the ear 17 of the valve chest by means of a link 27. Similarly, a point 28 of the lever 20 intermediate its fulcrum 22 and the pivot 25 is connected by means of a link 29 to the ear 18 of the valve chest. In the present example the various fulcrums and pivots are formed by knife-edges to reduce friction to a minimum and to establish accurate lever ratios. The intermediate points 26 and 28 of the levers 19 and 20 divide these levers into equal ratios between their respective fulcrums and pivots. The distances between the different points of the levers have been designated with $a$, $b$, $c$ and $d$ respectively in the drawing. The arrangement is such that the ratio of $$\frac{a}{b}$$

is equal to the ratio $$\frac{c}{d}$$

With such a support the valve structure can only move uniformly, that is, it is prevented from tilting. The mechanism shown may permit a very slight tilting of an amount that may be ignored. From another viewpoint, the structure 10 is constrained to parallelism or horizontality. This can be readily shown by a simple geometric consideration. I have indicated the valve structure and the lever mechanism in dotted lines in a position which the valve structure and the lever mechanism may assume during normal operation of the turbine. The weight of the valve structure is counterbalanced by means of a weight or a balancing mechanism connected to at least one of the levers 19 or 20. In the present instance I have indicated a weighted balancing mechanism connected to a left-hand extension 30 of the lever 19. This mechanism comprises a lever or weighbeam 31 having one end connected to a fulcrum 32 and an intermediate point 33 connected by means of a link 34 to the left-hand end of the extension 30. The right-hand end 31 of the lever is provided with a weight 35. The weight 35 is secured to a ceiling 36 by means of a safety link 37 which prevents dropping of the weight 35 to the floor in case of breakage of the lever 31 or the link 34. The dotted lines indicated in the balancing mechanism indicate the position of the balancing mechanism corresponding to the dotted-line position of the lever mechanism and the valve structure. During movement of the valve structure, due to expansion of the conduit 13 and the turbine 14, the lever 31 with the weight 35 turns slightly up and down about the fulcrum 32. The leverage, together with the knife-edged supports for the different levers, make the supporting mechanism very sensitive. The valve structure 10 can be forced up or down by the manual application of small forces to the right-hand end of the lever 31. In certain cases it may be desirable to permit slight deviation from parallelism. This may be accomplished in simple manner by varying slightly the above ratios.

The arrangement in Fig. 2 comprises a valve chest 40 corresponding to chest 10 of Fig. 1 and having an inlet conduit 41 and an outlet conduit 42. The chest is connected by two links 43 and 44 to intermediate points 45 and 46 respectively of two levers 47 and 48 respectively. The levers are fulcrumed at 49 and 50 respectively. One end of each lever is connected to one end of the other by a pivot 51. So far, the mechanism is similar to the one described in connection with Fig. 1. It distinguishes from the arrangement of Fig. 1 in that a balancing weight is connected to each lever. In the present instance the lever 47 has a left-hand extension provided with a balancing weight 52, and the lever 48 has a right-hand extension provided with a balancing weight 53. The operation of the mechanism is the same as that described above in connection with Fig. 1. Assuming that the levers 47 and 48 are of equal length and are equally divided by their pivots and fulcrums, then instead of providing two weights for the two levers, a single weight of double the weight may be provided on one of the levers. Also, in this case the intermediate pivots 45 and 46 divide the portions of the levers intermediate their common pivot and their fulcrums into equal ratios. The arrangement of the pivots 45 and 46 and of the fulcrums 49 and 50 respectively is preferably symmetrical with respect to the pivot 51 connecting the levers 47 and 48.

Fig. 3 shows another embodiment of my invention comprising a valve chest 55 corresponding to the chest 40 of Fig. 2 and a turbine inlet conduit 56 connected to the chest by means of bolts 57. Whereas in the arrangements of Figs. 1 and 2 the turbine inlet conduits were supported by the turbine and the valve chest only, I provide in the present example an arrangement in which the turbine inlet conduit is also directly supported by or attached to the supporting structure. To this end a supporting point 58 of the conduit is connected by means of a link 59 to a pivot 60 of a lever 61. The right-hand end of the lever 61 is connected to a fulcrum 62 and its left-hand end has a pivot 63 connected to the right-hand end of another lever 64 including a fulcrum 65 and having a pivot 66 connected to a supporting point 67 of the valve chest 55 by means of a link 68. The left-hand end of the lever 64 has an extension carrying a counterweight 69. As will be readily seen, the valve chest in this case has only one supporting point connected to one of the levers in contrast to the arrangement described above. The point 58 attached to the lever 61 may normally form a supporting point as in the examples described in connection with Figs. 1 and 2, or the point 58 connected to the lever mechanism may merely serve to restrain the chest and the conduit to predetermined movement during operation of the turbine. This restraint is accomplished by the transmission of forces in either direction through the link 59 in response to changes of the force transmitted from the supporting point 67 of the chest to the lever mechanism. Furthermore, whereas the knife edges 26 and 28 in Fig. 1 and the pivots 45 and 46 in Fig. 2 are symmetrically arranged with respect to the pivots 25 and 51 respectively, there is no symmetrical arrangement in the embodiment shown in Fig. 3; but also here the ratio $$\frac{e}{f}$$

is equal to the ratio $$\frac{g}{h}$$

The weight 69 must be sufficient to balance the weight of the valve chest and part of the conduit.

With my invention I have accomplished an improved construction and arrangement of a supporting structure in the form of a counterweighted mechanism which supports and "follows up" with a parallel motion. My supporting structure eliminates or considerably reduces so-called bending and moment stresses which result from non-parallel or angular motion whenever a slight relative movement between two rigidly interconnected bodies takes place. The supporting structure comprises at least two levers connected to at least two points of the body to be supported, whereby a tendency of any one of the two points to move out of parallelism is prevented in that movement of one point causes the other point to move automatically in the same direction to the same degree. The system, as pointed out above, may include a single or a plurality of counter-weights. As long as the levers connected to the body to be supported are divided in certain ratios, the supporting structure will constrain movements of the body to parallelism. If said ratios are not equal, a definite angular or tilted movement of the body will result.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. The combination of a prime mover, a conduit of considerable length with a heavy valve structure connected to the prime mover, and means having portions secured to the valve structure for supporting the valve structure and constraining it to horizontality when the valve structure is moved in any direction.

2. The combination of an elastic fluid turbine, a valve structure connected to and spaced apart from the turbine, a structural support, and means securing the support to the valve structure restraining said structure to horizontal motion during expansion of the turbine, tending to tilt the valve structure.

3. The combination of an elastic fluid turbine, a support for the turbine permitting expansion of the turbine in direction of the turbine inlet, a conduit and a valve chest connected to the turbine inlet, and a supporting structure for the valve chest comprising a counter-weighted lever mechanism having one portion secured to and supporting the valve chest and another portion securely attached to the conduit to cause predetermined movement of the chest during operation of the turbine.

4. The combination of an elastic fluid turbine having a casing with an inlet at one axial end, a conduit connected to the inlet having a portion of considerable length in axial direction of the turbine, a heavy valve structure connected to the free end of the conduit, the turbine being prevented from expanding axially in a direction facing away from the inlet conduit, the expansion of the turbine casing in axial and vertical direction being substantially entirely transmitted to the inlet conduit thereby tending to tilt the heavy valve structure, and means securely connected to the valve structure for permitting parallel movement thereof but preventing the valve structure from tilting.

5. The combination of an elastic fluid turbine, an inlet conduit and a valve chest connected to the turbine inlet for conducting elastic fluid thereto, and means for supporting the valve chest and preventing the setting up of stresses between the conduit and the valve chest and the turbine during expansion of the latter, said means including a counterweighted lever mechanism secured to and forcing the valve chest to move in parallelism during expansion of the turbine.

DAVID A. ALLEE.